United States Patent [19]

Shinohara

[11] Patent Number: 5,780,068
[45] Date of Patent: Jul. 14, 1998

[54] INJECTION MOLD ASSEMBLY

[75] Inventor: Masahito Shinohara, Tokyo, Japan

[73] Assignee: NEC Corporation, Tokyo, Japan

[21] Appl. No.: 683,605

[22] Filed: Jul. 15, 1996

[30] Foreign Application Priority Data

Jul. 20, 1995 [JP] Japan ................................. 7-183791

[51] Int. Cl.$^6$ ................................................ B29C 45/36
[52] U.S. Cl. ................ 425/168; 425/192 R; 425/450.1; 425/810
[58] Field of Search ........................... 425/186, 810, 425/195, 168, 192 R, 450.1; 269/29

[56] References Cited

U.S. PATENT DOCUMENTS

| | | | |
|---|---|---|---|
| 1,311,342 | 7/1919 | Gloetzner | 425/810 |
| 5,427,520 | 6/1995 | Shimizu et al. | 425/556 |
| 5,464,339 | 11/1995 | Arakawa et al. | 425/186 |
| 5,472,334 | 12/1995 | Takahashi | 425/554 |
| 5,593,710 | 1/1997 | Asai | 425/552 |

*Primary Examiner*—Jay H. Woo
*Assistant Examiner*—Iurie A. Schwartz
*Attorney, Agent, or Firm*—Laff, Whitesel, Conte & Saret, Ltd.

[57] ABSTRACT

A fixed split mold and a movable split mold are clamped with each other to define a cavity for molding an optical disk. An annular tapered unit of the fixed mold includes a flange member and a tapered member threadably engaged with the flange member and having a tapered outer peripheral surface. The movable mold includes a base member and a tapered flange member having a tapered inner peripheral surface having an inclination equivalent to that of the tapered outer peripheral surface. After the fixed mold and movable mold are clamped to align the first and second molds, the mold assembly is mounted on and secured to a molding machine. Then, the bolts and nuts are removed and the tapered member is detached. Subsequent successive closing and opening operations of the mold assembly for molding operations do not cause any unevenness of the depth of the cavity, thereby obtaining a uniform thickness in the products which are also free from birefringence.

5 Claims, 5 Drawing Sheets

INJECTION MOLD ASSEMBLY

BACKGROUND OF THE INVENTION (a) Field of the Invention

The present invention relates to an injection mold assembly and, in particular, to an injection mold assembly used for molding a disk-shaped product such as an optical disk for which a high dimensional accuracy in thickness is required.

(b) Description of the Related Art

FIG. 1 is a cross-sectional view of a conventional injection mold assembly, which is used for molding a disk-shaped product. Specifically, it includes a fixed mold 101a, which is called a first split mold, secured to a fixed mold plate 151 of an injection molding machine, and a movable mold 101b, which is called a second split mold, secured to a movable mold plate 152. The movable mold 101b is movable relative to the fixed mold 101a by a movement of the movable mold plate 152. In the illustration, the axis of the movable mold 101b is shown offset downward, as viewed in the figure, relative to the axis of the fixed mold 101a. It should be understood that the offset is exaggerated to a certain extent in order to facilitate an understanding of the misalignment to be described later, and that an actual offset is on the order of several microns.

The fixed mold 101a and the movable mold 101b are provided with telescopic members 106 and 110, respectively. The telescopic member 106 associated with the fixed mold 101a is provided with a peripheral ring 105 at the peripheral edge of the telescopic member 106. A combination of the telescopic members 106 and 110 and the peripheral ring 105 defines a cavity when the mold assembly is closed.

A male ring cotter or first annular member 104 is provided around the outer periphery of the fixed mold 101a. The male ring cotter 104 has a peripheral surface in front thereof which is formed as a tapered surface 104a. A female ring cotter or a second annular member 111 is provided around the outer periphery of the movable mold 101b. The female ring cotter 111 has an inner peripheral surface in front thereof which is formed as a tapered surface 111a having an inclination equivalent to that of the tapered surface 104a of the male ring cotter 104. When the mold assembly is closed, the male ring cotter 104 is fitted or telescoped into the female ring cotter 111.

In the mold assembly as mentioned above, if the axes of the fixed mold 101a and the movable mold 101b are aligned, successive forward movement of the movable mold plate 152 allow the movable mold 101b to be moved directly toward the fixed mold 101a, thereby closing the mold assembly. On the other hand, if the axes of the both molds are offset as illustrated in FIG. 1, when the movable mold 101b moves toward the fixed mold 194 during each closing operation, a sliding movement occurs between the tapered outer surface 104a of the male ring cotter 104 and the tapered inner surface 111a of the female ring cotter 111, producing a rubbing action therebetween in the region indicated by character "A".

As a consequence, the movable mold 101b will be slightly tilted upward as viewed in the figure, before the mold assembly is closed. In this manner, when the closing operation is completed, the axis of the movable mold 101b will be substantially aligned with the axis of the fixed mold 101a. The alignment of the axes is important for producing a molded product such as an optical disk, for example, for which a high dimensional accuracy is required.

As mentioned, it will be noted with a conventional injection mold assembly that the alignment between the fixed and the movable molds takes place by causing a sliding movement between the tapered surface of the male ring cotter and the tapered surface of the female ring cotter. Accordingly, if the both axes are misaligned, a biased abutment occurs between the tapered surfaces. Thus, a high load will be applied to the movable mold in the region, such as region "A" shown in FIG. 1, where the tapered surfaces strongly rub against each other while substantially no load is applied to the movable mold in the opposite region, such as region "B" shown in FIG. 1. When the load applied to the movable mold during the mold closing operation differs from part to part in the manner mentioned above, there is a problem that after the mold assembly is closed, there occurs an unevenness on the order of several tens of microns in the depth of the cavity. For the case illustrated in FIG. 1, for example, the depth of the cavity will be larger in the upper portion, as viewed in the figure, while it will be smaller in the lower portion.

A product which is molded in such an uneven cavity has a sheet thickness which varies from part to part. When forming an optical disk, in particular, this causes a problem that not only in respect of a variation in the sheet thickness, a large variation in the optical characteristics such as birefringence occurs across the surface.

In the field for molding an optical disk, an injection compression molding process is also employed for the purpose of controlling birefringence which is attributable to internal stresses of the molded product. The injection compression molding process uses an operation which opens the mold assembly by an amount corresponding to the compression stroke, which is normally on the order of 100 μm. With the conventional mold illustrated in FIG. 1 and used for the injection compression molding process, the degree of the opening will vary from location to location when a biased abutment of the tapered surface occurs, giving rise to a problem in that the compression effect significantly changes with the location.

SUMMARY OF THE INVENTION

It is an object of the present invention to provide an injection mold assembly which reduces an unevenness of a thickness of a cavity by eliminating a biased abutment of tapered surfaces during repetitive closing operations of the mold assembly.

It is another object of the present invention to provide an injection mold assembly which prevents a rubbing of the tapered surfaces against each other.

In accordance with the present invention, there is provided an injection mold assembly having a first and a second split molds to be clamped with each other to define a cavity therebetween in a closed position of the mold assembly, the first split mold including a first base unit and a first tapered unit supported by the first base unit in front thereof, the first tapered unit having a tapered outer peripheral surface, the second split mold including a second base unit and a second tapered unit supported by the second base unit in front thereof, the second tapered unit having a tapered inner peripheral surface having an inclination equivalent to an inclination of the tapered outer peripheral surface to thereby allow the first tapered unit to be telescoped into the second tapered unit, at least one of the first and second tapered units being detachably mounted by a corresponding one of the first and second base units.

In accordance with the present invention, after the injection mold assembly is mounted on and secured to an injection molding machine, the one of the tapered units is removed. Accordingly, a rubbing of the tapered surfaces against each other can be avoided when the mold assembly is opened or closed for a molding operation. That is, a change in a delicate behavior of the molds which results from a rubbing of the tapered surfaces against each other is completely removed, allowing a variation in the thickness of the cavity to be substantially eliminated, which may otherwise occur when the mold assembly is opened or closed for a molding operation. A holding structure, if added in the injection mold assembly, allows the alignment of the central axes of the individual split molds before and after the detachment of the one of the tapered units and substantially eliminates the rubbing of the tapered surfaces. Such a mold assembly is suitable for use in molding an optical disk for which a high dimensional accuracy is required.

In particular, the holding structure may be constructed such that the force applied to maintain the alignment be applied in a direction parallel to the central axis of the mold assembly, thereby preventing a misalignment of the split molds from occurring during a transport of the mold assembly.

DESCRIPTION OF THE PREFERRED EMBODIMENT

Figure 1:
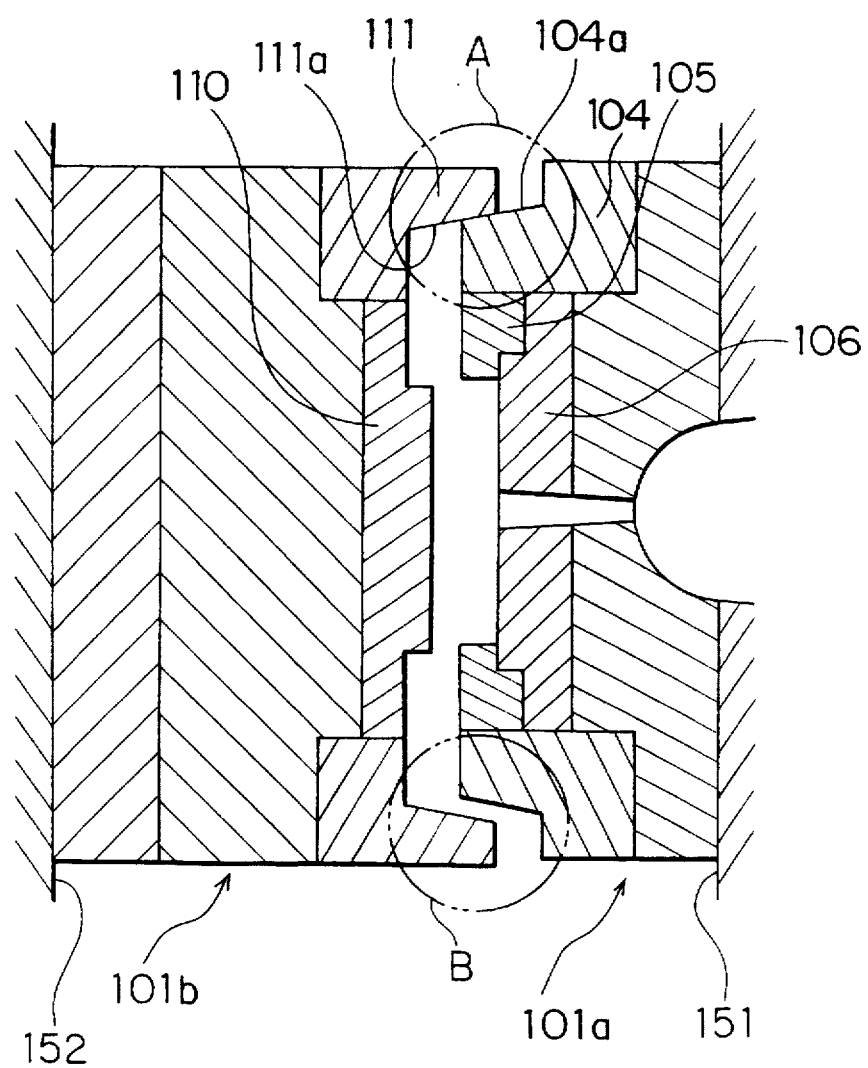
FIG. 1 is a longitudinal sectional view of a conventional injection mold assembly.

Referring to the drawings, an embodiment of the invention will now be described. FIGS. 2 through 5 show the injection mold assembly according to the present embodiment.

It is to be understood that those figures indicate only essential elements of the present invention, and parts which are also provided in a conventional mold, but which are not essential to the present invention, such as temperature adjusting means, product releasing mechanism, a mold plate clamping structure, sprue bushing and the like, are omitted from the illustrations for a simplification purpose.

The mold assembly 1 of the present embodiment is used for producing an optical disk, and includes a fixed mold 1a which is called a first split mold and a movable mold 1b which is called a second split mold. The fixed mold 1a is secured to a fixed mold plate 51 of an injection molding machine. The movable mold 1b is secured to a movable mold plate 52 of the injection molding machine. By driving the movable mold plate 52, the movable mold 1b is movable relative to the fixed mold 1a.

Figure 2:
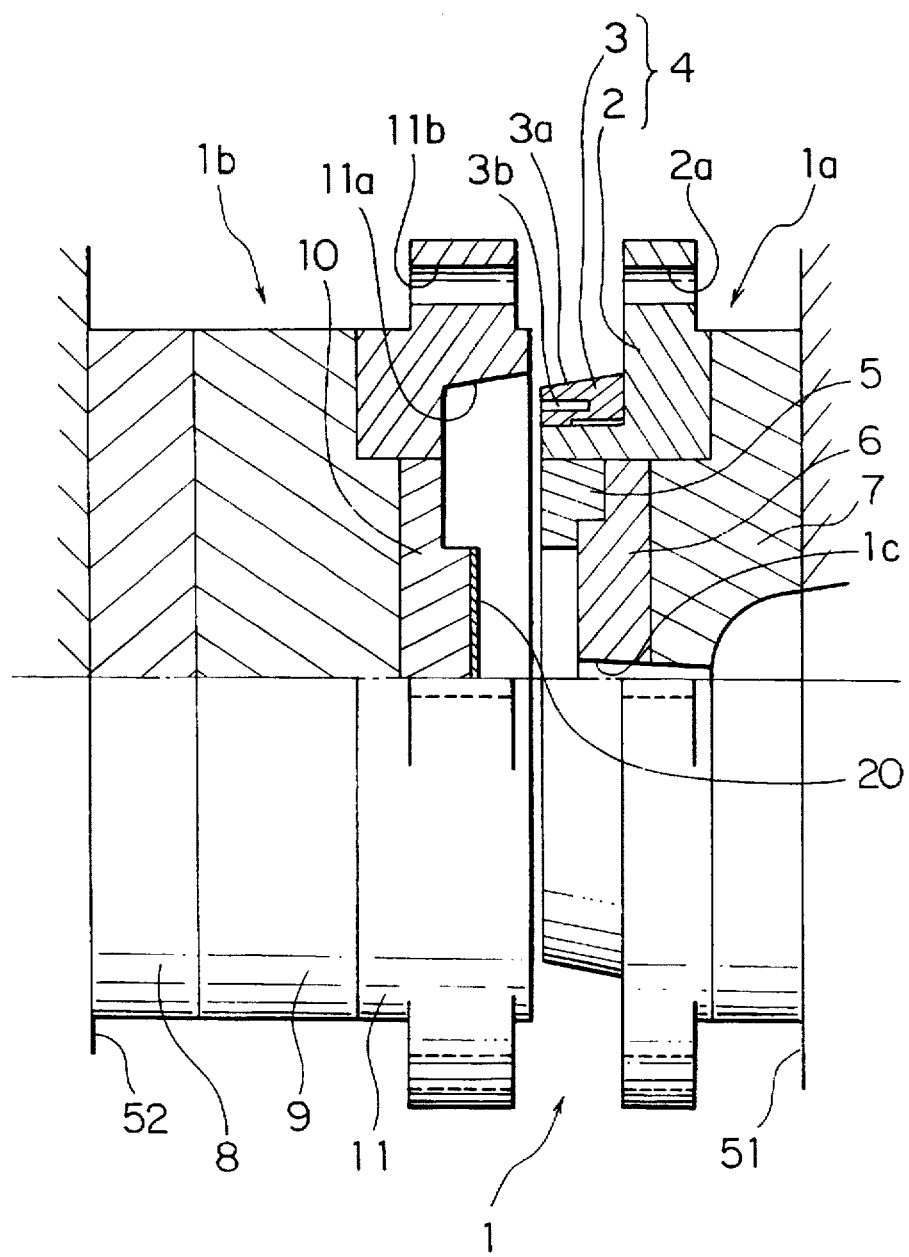
FIG. 2 illustrates an injection mold assembly according to an embodiment of the present invention, the lower half, as viewed in the drawing, of the mold assembly being shown in side view and the upper half being shown in a longitudinal section.
Figure 3:
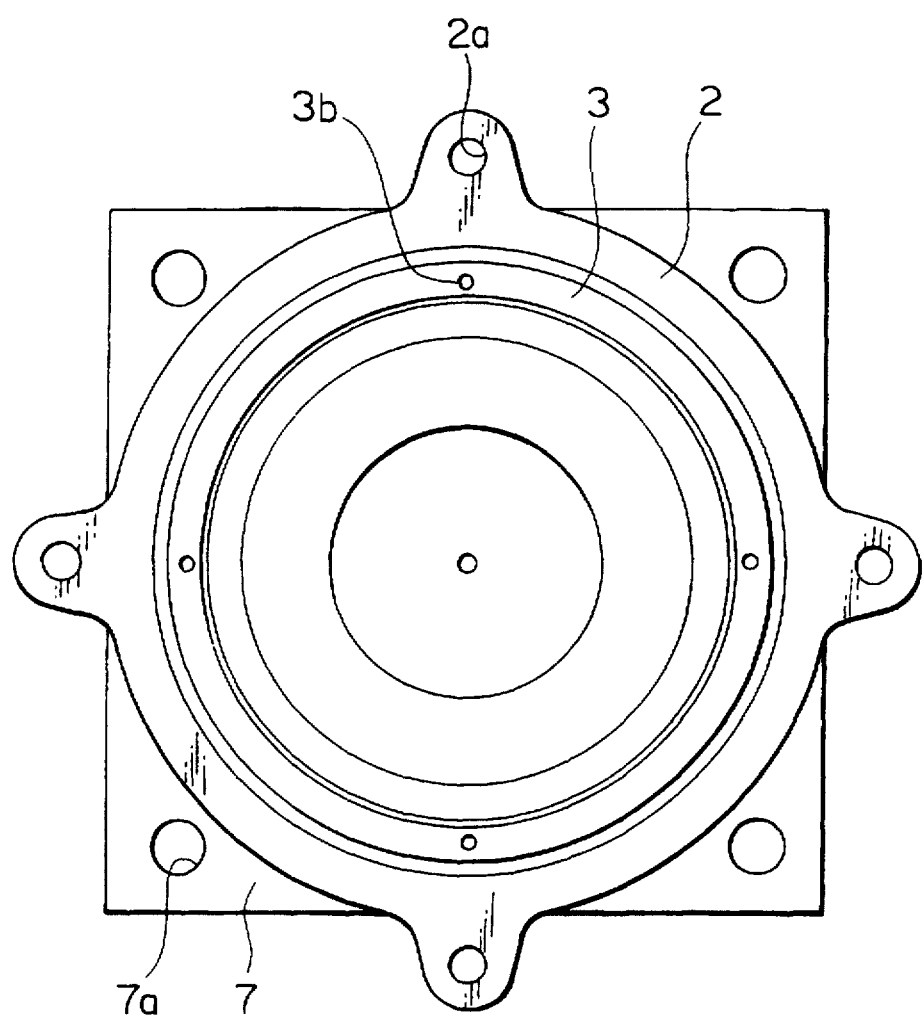
FIG. 3 shows a fixed mold of the injection mold assembly shown in FIG. 2, as viewed from a movable mold.

The fixed mold 1a includes a fixed base unit formed by a mold plate 7, a telescopic member 6 and a peripheral ring 5 which cooperate to define a cavity 12 (see FIG. 4), and an annular tapered unit 4 secured to the outer periphery of the mold plate 7 of the fixed base unit. Specifically, the annular tapered unit 4 includes a flange member 2 attached to the fixed base unit and a tapered member 3 detachably mounted on the flange member 2. In the region where the flange member 2 and the tapered member 3 are secured together, there are provided threaded portion to threadably engage the tapered member 3 with the flange member 2 for securing the tapered member 3 to the flange member 2. The outer peripheral surface of the tapered member 3 is defined as a tapered area 3a. As shown in FIGS. 2 and 3, the flange member 2 is provided with four extrusions extending outwardly in the direction of the radius of the cavity. Through-openings 2a are formed in the extrusions, extending parallel to the central axis of the fixed mold 1a. In the surface region of the tapered member 3 disposed opposite to the movable mold 1b, four threaded-openings 3b are formed in the tapered member 3.

The movable mold 1b includes a movable base unit formed by a pair of mold plates 8 and 9, a telescopic member 10 which defines a cavity 12 together with the telescope member 6 and the peripheral ring 5 of the fixed mold 1a, and an annular tapered member 11 which is secured to the outer periphery of the mold plate 9. In a similar manner, the annular tapered member 11 has four extrusions in which through-openings 11b are formed extending parallel to the central axis of the movable mold 1b. It is to be noted that the through-openings 11b are located opposite to the through-openings 2a formed in the extrusions of the fixed mold 1a. The inner peripheral surface of the annular tapered member 11 is formed as a tapered area 11a having an inclination equivalent to that of the tapered area 3a of the fixed mold 1a. A stamper 20 is attached to the surface of the telescopic member 10 for forming a pattern on an optical disk.

Figure 4:
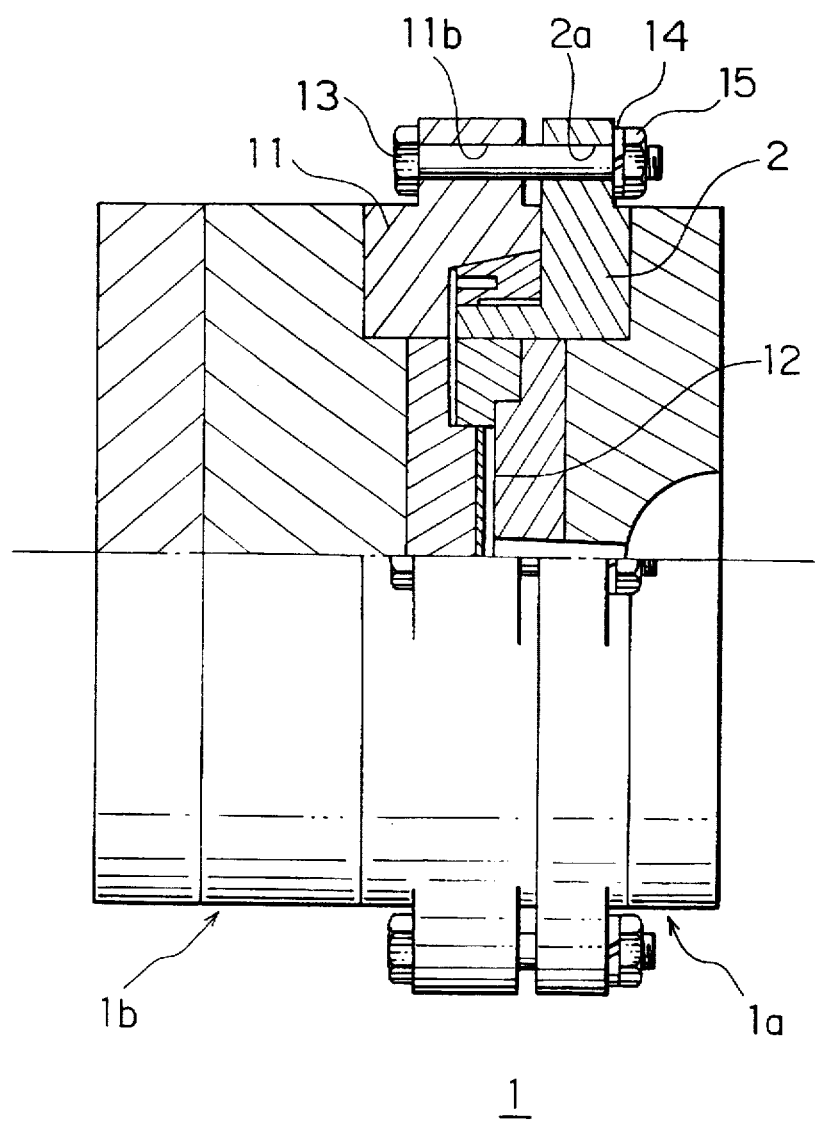
FIG. 4 illustrates the injection mold assembly in which two split molds in FIG. 2 are secured together by clamping volts.

After the mold assembly is closed, as shown in FIG. 4, a combination of the telescopic member 6, the peripheral ring 5 and the stamper 20 defines a cavity 12. A gate 1c in FIG. 2, which is used to introduce a molten resin into the cavity 12, is formed in the fixed mold 1a. When the molten resin is injected to the cavity 12 from an injector unit, not shown, of the injection molding machine through the gate 1c, an intended product is molded. While an arrangement including the stamper 20 attached to the movable mold 1b is illustrated here, it is also possible to attach the stamper to the fixed mold 1a.

Before performing a molding operation using the mold assembly 1 mentioned above, an alignment between the fixed mold 1a and the movable 1b must be achieved. The alignment between the both molds takes place before the both molds are secured to the injection molding machine according to the principle of the present invention.

A procedure to align the movable mold 1b with the fixed mold 1a will now be described. Initially, while centerring the fixed mold 1a with respect to the movable mold 1b, the tapered area 3a of the fixed mold 1a is fitted or telescoped into the tapered area 11a of the movable mold 1b, thereby coupling the mold assembly 1. Subsequent to the coupling of the mold assembly 1, bolts 13 are passed through the through-openings 11b in the annular tapered member 11 and through the through-opening 2a of the flange member 2, and nuts 15 are threadably engaged with the bolts 13 with washers 14 interposed therebetween, thereby temporarily clamping the both split molds 1a and 1b together. In this manner, an alignment between the fixed mold 1a and the movable mold 1b is achieved when they are closed and clamped together, inasmuch as the tapered area 3a on the tapered member 3 and the tapered area 11a on the annular tapered member 11 are of an equal inclination.

It will be apparent from the foregoing description that a combination of the through-openings 2a in the flange member 2, the through-openings 11a in the annular tapered member 11, the bolts 13 and the nuts 15 constitute together a holding structure which temporarily holds the fixed mold 1a and the movable mold 10b in their closed position.

While the bolts 13 and the nuts 15 are used to secure the fixed mold 1a and the movable mold 1b together in the above embodiment, it should be understood that the means which secure the both split molds together are not limited to the combination of the bolts 13 and the nuts 15. It is also to be noted that in order to avoid a misalignment between the fixed mold 1a and the movable mold 1b during a transport of the mold assembly 1, it is desirable that the force which holds the both molds together act in the direction parallel to the central axis of the mold assembly 1.

Then takes place an operation which attaches and secures the mold assembly 1 to the fixed mold plate 51 and the movable mold plate 52 of the injection molding machine while maintaining the fixed mold 1a and the movable mold 1b clamped together. The fixed mold 1a is clamped to the fixed mold plate 51 by passing bolts, not shown, through a through-openings 7a (see FIG. 3) formed in the mold plate 7 of the fixed mold 1a. On the other hand, the movable mold 1b is secured to the movable mold plate 52 by passing bolts, not shown, through openings, not shown, formed in the mold plate 8 of the movable mold plate 1b.

It is to be understood that when the mold assembly 1 is attached to the injection molding machine, the movable mold plate 52 assumes its closed position. After the mold assembly is secured to the injection molding machine, the bolts 13, nuts 15 and washers 14 which are used in clamping the fixed mold 1a and the movable mold 1b together are removed, allowing the mold assembly 1 to be repeatedly opened and closed for successive molding operations.

Since the injection mold assembly is secured to the injection molding machine while it is maintained in an closed position, the alignment between the fixed mold 1a and the movable mold 1b is already achieved, eliminating a subsequent biased abutment between the tapered area 3a of the tapered member 3 and the tapered area 11a of the annular tapered member 11.

Where a high level of dimensional accuracy is not required for a product to be molded, a molding operation may take place under this condition while sufficiently suppressing a variation in the thickness of the products to be molded. However, where a high level of dimensional accuracy is required as when molding a product such as an optical disk, it is desirable that the tapered member 3 be removed from the fixed mold 1a before performing the molding operations.

The removal of the tapered member 3 takes place in a manner mentioned below. After the bolts 13, nuts 15 and washers 14 are removed in the manner mentioned above, the mold assembly 1 is opened. Subsequently, at least two bolts, not shown, are threadably engaged with the respective threaded openings 3b formed in the tapered member 3, and the tapered member 3 is rotated by utilizing the engaged bolts as handles. The rotation of the tapered member 3 by using bolts which are threadably engaged with the threaded openings 3b in the tapered member 3, allows the removal of the tapered member 3 without causing any damage to the tapered area 3a of the tapered member 3.

Figure 5:
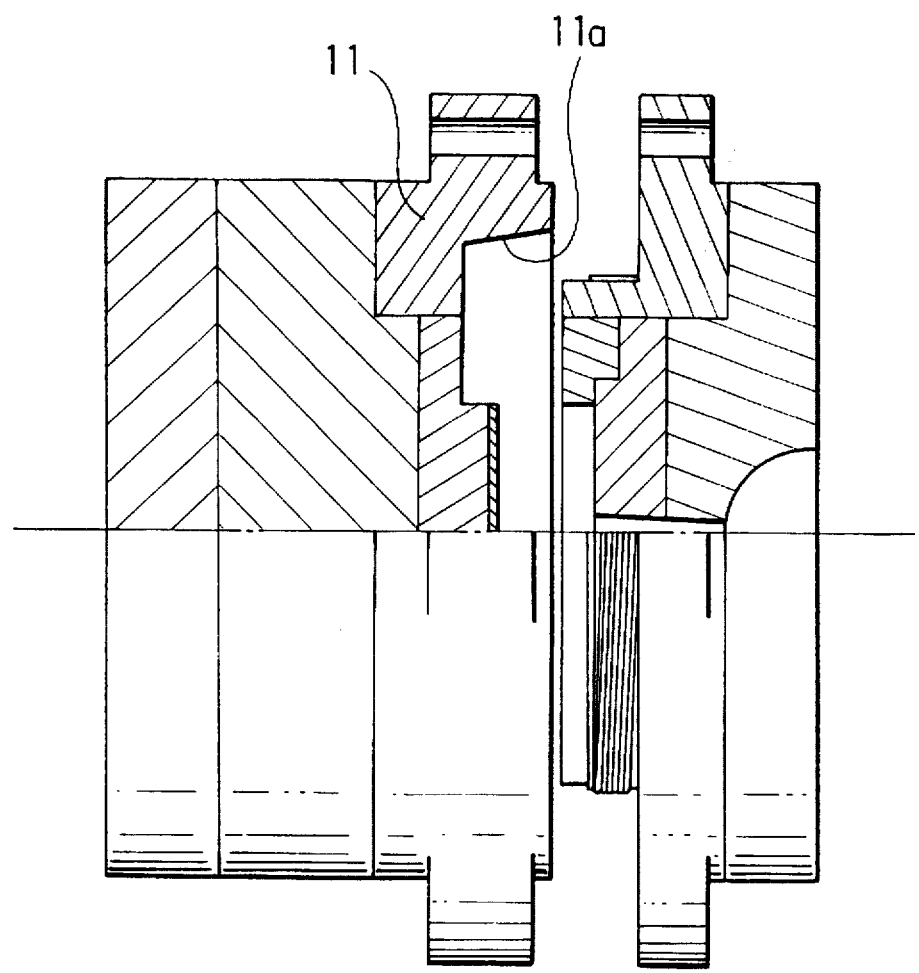
FIG. 5 illustrates the injection mold assembly shown in FIG. 2 after a tapered unit of the fixed mold is removed.

It will be seen from FIG. 5 that there is nothing which abuts against the tapered area 11a of the annular tapered member 11 after the tapered member 3 is removed. Accordingly, any change in a delicate behavior of the mold assembly 1 which may results from a rubbing of the tapered area 11a is completely eliminated, substantially eliminating any variation in the thickness of the cavity 12 as the mold assembly 1 is opened or closed for molding operations. The mold assembly 1 is suitable for use in molding an optical disk.

In the present embodiment, the annular tapered unit 4 includes the flange member 2 and the tapered member 3 while the annular tapered member 11 is of an integral part. However, a similar effect will be achieved by another arrangement in which the annular tapered unit 4 is of an integral part while the annular tapered member 11 is formed of a pair of parts, one of which is tapered and mounted in a detachable manner to the other. Also, while the annular tapered unit 4 is mounted on the fixed mold 1a while the annular tapered member 11 is mounted on the movable mold 1b in the embodiment, a reverse arrangement may also be employed.

Since the above embodiment is described only for an example, the present invention is not limited to such an embodiment and it will be obvious for those skilled in the art that various modifications or alterations can be easily made based on the above embodiment within the scope of the present invention.

What is claimed is:

1. An injection mold assembly for an injection molding machine, said injection mold assembly comprising a first and a second split molds to be clamped with each other to define cavity therebetween in a closed position of said mold assembly, said first split mold including a first base unit and a first tapered unit supported by said first base unit in front thereof, said first tapered unit having a tapered outer peripheral surface, said second split mold including a second base unit and a second tapered unit supported by said second base unit in front thereof, said second tapered unit having a tapered inner peripheral surface having an inclination equivalent to an inclination of said tapered outer peripheral surface to allow said first tapered unit to be telescoped into said second tapered unit for alignment, said first base unit and said second tapered/unit defining said cavity, at least one of said first and second tapered units being detachably mounted on a corresponding one of said first and second base units so that said injection mold assembly can operate without said detachable mounted unit in place, whereby said first and second units do not bind as they telescope into alignment.

2. An injection mold assembly as defined in claim 1 wherein said at least one of said first and second tapered units has a screw portion for attachment to and detachment from said corresponding one of said first and second base units.

3. An injection mold assembly as defined in claim 1 further comprising a holding structure for holding said first and second split molds in said closed position to align together said first and second split molds in association with said first and second tapered units.

4. An injection mold assembly as defined in claim 3 wherein said holding structure applies said first and second split molds with a holding force parallel to central axes of said first and second split molds.

5. An injection mold assembly as defined in claim 4 wherein said holding structure incudes a plurality of combinations of bolts and nuts.

* * * * *